(12) United States Patent
Carty

(10) Patent No.: US 7,347,477 B2
(45) Date of Patent: Mar. 25, 2008

(54) COLLAPSIBLE SEATING APPARATUS

(76) Inventor: Marty J. Carty, 75 Barleycorn Dr., Sunbury, OH (US) 43074

( * ) Notice: Subject to any disclaimer, the term of this patent is extended or adjusted under 35 U.S.C. 154(b) by 61 days.

(21) Appl. No.: 11/471,264

(22) Filed: Jun. 20, 2006

(65) Prior Publication Data

US 2006/0284438 A1  Dec. 21, 2006

Related U.S. Application Data

(60) Provisional application No. 60/694,209, filed on Jun. 20, 2005.

(51) Int. Cl.
*B62D 33/03* (2006.01)

(52) U.S. Cl. .............. 296/65.03; 296/65.05; 296/65.16

(58) Field of Classification Search .......... 296/63, 296/64, 65.01, 65.03, 65.05, 69, 65.06, 65.09, 296/65.16; 297/16.1, 17
See application file for complete search history.

(56) References Cited

U.S. PATENT DOCUMENTS

| | | | |
|---|---|---|---|
| 3,029,109 A | 4/1962 | Nail | |
| 3,927,911 A * | 12/1975 | Rosquist | ............... 296/69 |
| 4,412,403 A | 11/1983 | LeFranc et al. | |
| 4,611,439 A | 9/1986 | Graham, Jr. | |
| 5,029,928 A | 7/1991 | Huber | |
| 5,501,501 A | 3/1996 | White et al. | |

\* cited by examiner

*Primary Examiner*—Lori L. Lyjak

(57) ABSTRACT

A collapsible seating apparatus is provided for use on a bed of a vehicle, wherein the vehicle bed includes a vehicle bed length and a vehicle bed width. The collapsible seating apparatus includes a container which includes a container length which is substantially less than the vehicle bed length and which includes a container width which is less than the vehicle bed width. A collapsible seat assembly is retained in the container in a nondeployed condition in a storage mode, and the collapsible seat assembly is transformed into a deployed condition for use by persons who sit on the deployed collapsible seating apparatus. The deployed collapsible seat assembly fits upon the vehicle bed. When the collapsible seating apparatus of the invention is deployed in a pickup truck bed, persons can sit in the deployed collapsible seat assembly and view outdoor events from the pickup truck by looking out the back of the pickup truck.

10 Claims, 4 Drawing Sheets

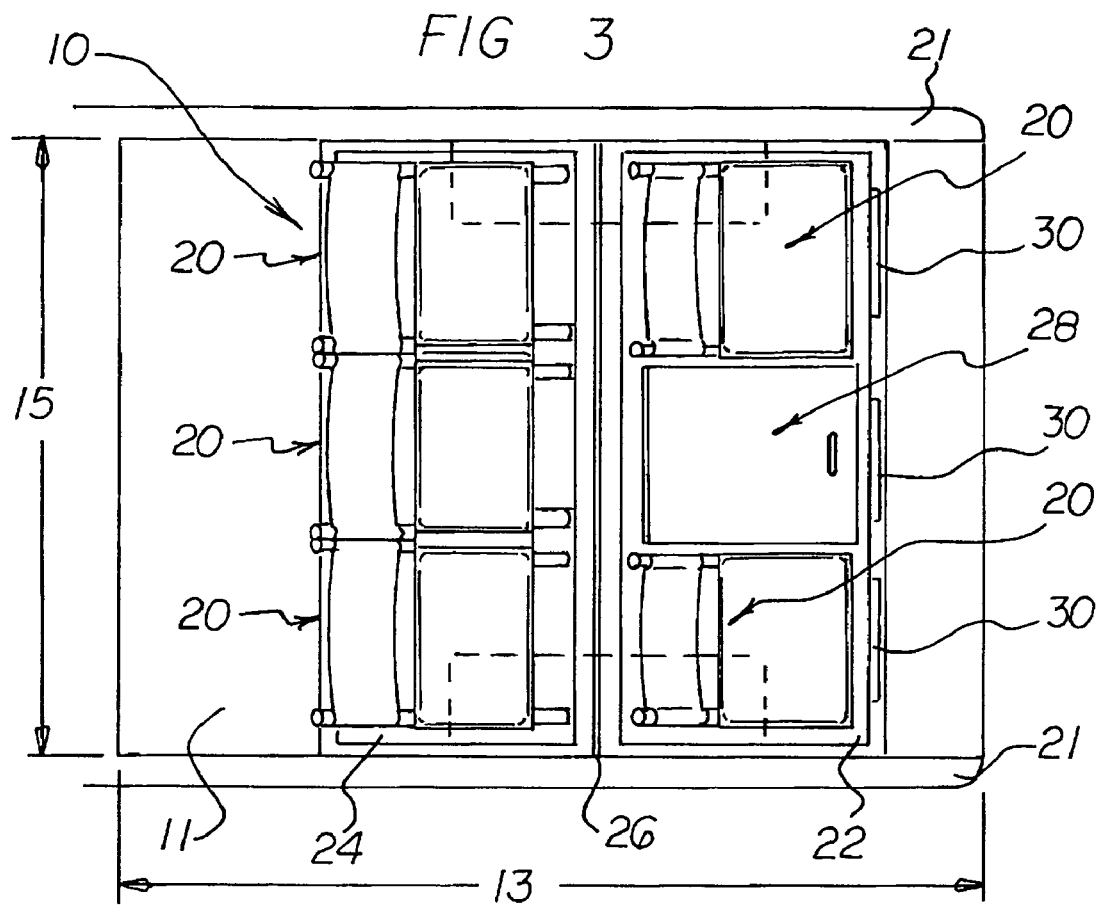
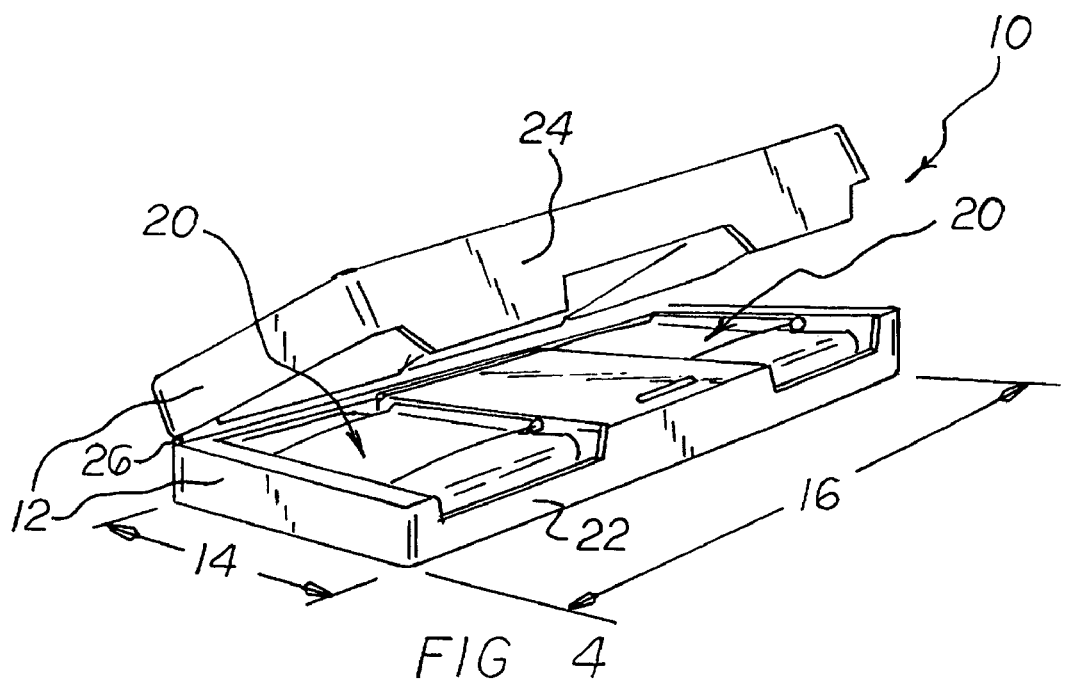

COLLAPSIBLE SEATING APPARATUS

CROSS-REFERENCE TO RELATED APPLICATION

This application claims priority based upon my now abandoned Provisional Application Ser. No. 60/694,209; filed Jun. 20, 2005.

BACKGROUND OF THE INVENTION

1. Field of the Invention

The present invention relates generally to collapsible seats, and, more particularly, to collapsible seats especially adapted for transport and use at remote locations.

2. Description of the Prior Art

During outdoor events, many pickup truck owners use their vehicle as a place to sit and view the outdoor events. One way of using a pickup truck for viewing outdoor events is to sit on a lowered tailgate. A disadvantage of using a lowered tailgate is the lack of support for a person's back when sitting on the lowered tailgate. Another disadvantage of using a lowered tailgate in the limited linear space provided by the tailgate. The linear space provided by the tailgate is limited by the width of the vehicle. For such reasons, it would be desirable to provide seating apparatus that can be used in conjunction with a pickup truck that does not to employ the tailgate.

Another way of using a pickup truck for viewing outdoor events is to carry a number of lawn chairs in the bed of the pickup truck and to deploy the lawn chairs on the ground when the outdoor event is reached. A disadvantage of using lawn chairs on the ground is that the sightline of a person seated in a ground-supported lawn chair is limited by the relatively low position, near the ground. In this respect, it would be desirable to provide seating apparatus that can be used in conjunction with a pickup truck that does not employ chairs supported on the ground.

Another way of using a pickup truck for viewing outdoor events is for a person to sit on the roof of the vehicle. A number of disadvantages are associated with a person sitting on a vehicle roof. One disadvantage is that a roof is not designed for supporting the weight of one or more persons, and the roof may be damaged by the weight of the person or persons sitting on the roof. Another disadvantage is that access to the roof is not easy. The vehicle is not designed to provide convenient footing for a person to climb up onto the roof and sit thereon. Other disadvantages of using a vehicle roof relate to the fact that support for a person's back is not provided, and the width of the seating area is limited by the width of the vehicle roof. In this respect, it would be desirable to provide seating apparatus that can be used in conjunction with a vehicle that does not employ the roof of the vehicle.

Still other features would be desirable in a seating apparatus that can be used in conjunction with a pickup truck. For example, it would be desirable if such seating apparatus could be easily collapsed for easy transport by a pickup truck and removal from the pickup truck.

With respect to collapsible seating apparatus for use with a pickup truck, it would be desirable if at least two different classes of embodiments could be provided. One class of embodiments would include seats that have rigid mechanical components that fold and unfold with respect to each other. Another class of embodiments would include seats that are made from flexible material, that are inflatable with air to become substantially rigid, and that collapse when air is removed from the inflatable seats.

Thus, while the discussion indicates it to be well known to use pickup trucks to view outdoor events, the known uses of a pickup truck do not teach or suggest the provision of a collapsible seating apparatus which has the following combination of desirable features: (1) does not employ the tailgate; (2) does not employ chairs supported on the ground; (3) does not employ the roof of a vehicle; (4) can be easily collapsed for easy transport by a pickup truck and removal from the pickup truck; (5) that provides one class of embodiments which includes seats that have rigid mechanical components that fold and unfold with respect to each other; and (6) that provides another class of embodiments which includes seats that are made from flexible material, that are inflatable with air to become substantially rigid, and that collapse when air is removed from the inflatable seats. The foregoing desired characteristics are provided by the unique collapsible seating apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a collapsible seating apparatus for use on a bed of a vehicle, wherein the vehicle bed includes a vehicle bed length and a vehicle bed width. The collapsible seating apparatus includes a container which includes a container length which is substantially less than the vehicle bed length and which includes a container width which is less than the vehicle bed width. A collapsible seat assembly is retained in the container in a nondeployed condition in a storage mode, and the collapsible seat assembly is transformed into a deployed condition for use by persons who sit on the deployed collapsible seating apparatus. The deployed collapsible seat assembly fits upon the vehicle bed. When the collapsible seating apparatus of the invention is deployed in a pickup truck bed, persons can sit in the deployed collapsible seat assembly and view outdoor events from the pickup truck.

With one embodiment of the invention, the collapsible seat assembly includes foldable seat units which include rigid mechanical components that fold and unfold with respect to each other when transformed from the nondeployed condition to the deployed condition and vice versa.

Preferably, the container includes a first container portion, a second container portion, and a hinge assembly connected between the first container portion and the second container portion. The first container portion can house two foldable seat units and an article storage compartment. The second container portion can house three foldable seat units.

Preferably, first foldable wheel units are pivotally connected to bottom portions of the first container portion, and second foldable wheel units are pivotally connected to bottom portions of the second container portion.

With another embodiment of the invention, the collapsible seat assembly includes inflatable seat units which are made from flexible material, that are inflated with air to become substantially rigid in a deployed, inflated condition. For storage purposes, the inflatable seat units are deflated into a nondeployed condition. At least one of the inflatable seat units includes an inlet/outlet for permitting inflation and deflation of the inflatable seat units.

In general, top portions of the collapsible seat assembly can include a quantity of first hook or loop material. A patch assembly can be provided for attachment with the first hook or loop material on a top portion of the collapsible seat assembly.

More specifically, the patch assembly includes a quantity of second complementary hook or loop material for attachment to the first hook or loop material. A patch support layer is provided which supports the second hook or loop material.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two classes of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible seating apparatus which has all of the advantages of the prior art and none of the disadvantages.

It is another object of the present invention to provide a new and improved collapsible seating apparatus which may be easily and efficiently manufactured and marketed.

It is a further object of the present invention to provide a new and improved collapsible seating apparatus which is of durable and reliable construction.

An even further object of the present invention is to provide a new and improved collapsible seating apparatus which is susceptible of a low cost of manufacture with regard to both materials and labor, and which accordingly is then susceptible of low prices of sale to the consuming public, thereby making such collapsible seating apparatus available to the buying public.

Still yet a further object of the present invention is to provide a new and improved collapsible seating apparatus which does not employ the tailgate of a pickup truck.

Still another object of the present invention is to provide a new and improved collapsible seating apparatus that does not employ chairs supported on the ground.

Yet another object of the present invention is to provide a new and improved collapsible seating apparatus which does not employ the roof of a vehicle.

Even another object of the present invention is to provide a new and improved collapsible seating apparatus that can be easily collapsed for easy transport by a pickup truck and removal from the pickup truck.

Still a further object of the present invention is to provide a new and improved collapsible seating apparatus which that provides one class of embodiments which includes seats that have rigid mechanical components that fold and unfold with respect to each other.

Yet another object of the present invention is to provide a new and improved collapsible seating apparatus that provides another class of embodiments which includes seats that are made from flexible material, that are inflatable with air to become substantially rigid, and that collapse when air is removed from the inflatable seats.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view of the embodiment of the collapsible seating apparatus of FIG. 2 taken along line 3-3 thereof.

FIG. 4 is a perspective view of the embodiment of the invention shown in FIGS. 1-3 in a nondeployed, folded condition.

DESCRIPTION OF THE PREFERRED EMBODIMENT

Figure 1:
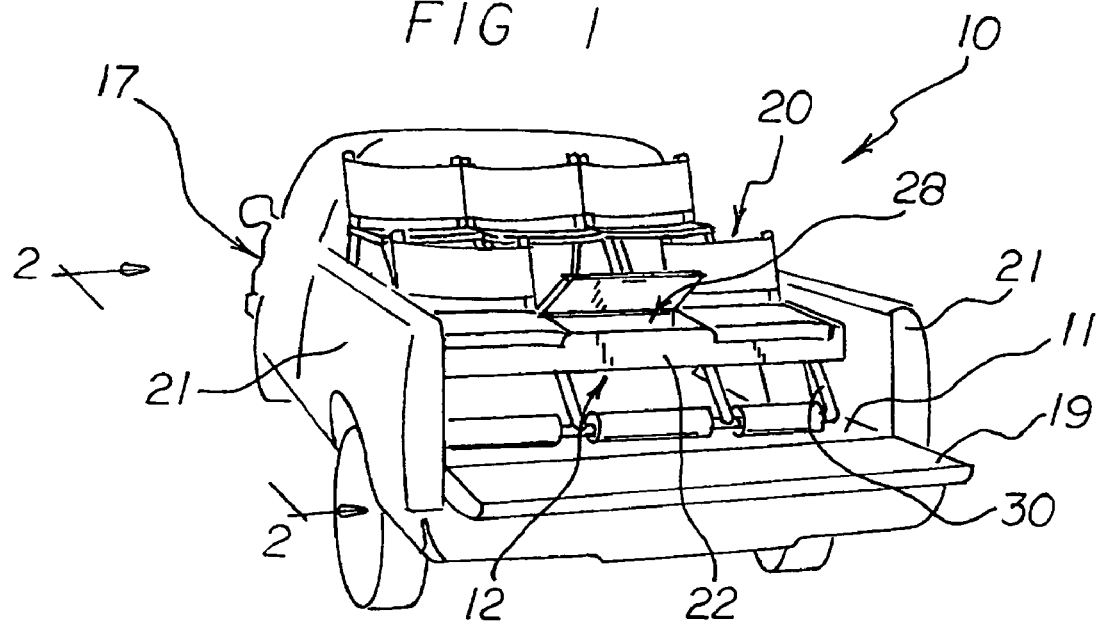
FIG. 1 is a rear perspective view showing a first embodiment of the collapsible seating apparatus of the invention which employs collapsible seat assemblies that have rigid mechanical components that fold and unfold with respect to each other and that are in a deployed condition on the bed of a pickup truck.

With reference to the drawings, a new and improved collapsible seating apparatus embodying the principles and concepts of the present invention will be described.

Turning to FIGS. 1-4, there is shown a first embodiment of the collapsible seating apparatus of the invention generally designated by reference numeral 10. In each of the figures, reference numerals are shown that correspond to like reference numerals that designate like elements shown in other figures. More specifically, a collapsible seating apparatus 10 is provided for use on a bed 11 of a vehicle, wherein the vehicle bed 11 includes a vehicle bed length 13 and a vehicle bed width 15. The collapsible seating apparatus 10 includes a container 12 which includes a container length 14 which is substantially less than the vehicle bed length 13 and which includes a container width 16 which is less than the vehicle bed width 15. A collapsible seat assembly is retained in the container 12 in a nondeployed condition in a storage mode, and the collapsible seat assembly is transformed into a deployed condition for use by persons who sit on the deployed collapsible seating apparatus 10. The deployed collapsible seat assembly fits upon the vehicle bed 11.

More specifically, when the collapsible seat assembly is in the deployed condition, the length of the deployed collapsible seat assembly is less than the vehicle bed length 13, and the width of the deployed collapsible seat assembly is less than the vehicle bed width 15.

Also, the vehicle can be a pickup truck 17, and the collapsible seating apparatus 10 can be placed on pickup truck bed 11 between the walls 21 adjacent to the bed. More specifically, the tailgate 19 is lowered, and the collapsible seating apparatus 10 is placed on the pickup truck bed 11 so that when the collapsible seating apparatus 10 is in the deployed condition the seats are facing rearward. Then, when the collapsible seating apparatus 10 is in the deployed condition, persons who want to use the seats climb up on the open tailgate 19 and sit in the seats, facing rearward of the pickup truck 17.

In accordance with a first embodiment of the invention, shown in FIGS. 1-4, the collapsible seat assembly includes foldable seat units 20 which include rigid mechanical components that fold and unfold with respect to each other when transformed from the nondeployed condition to the deployed condition and vice versa.

Preferably, the container 12 includes a first container portion 22, a second container portion 24, and a hinge assembly 26 connected between the first container portion 22 and the second container portion 24. The first container portion 22 can house two foldable seat units 20 and an article storage compartment 28. The second container portion 24 can house three foldable seat units 20.

Preferably, first foldable wheel units 30 are pivotally connected to bottom portions of the first container portion 22, and second foldable wheel units 32 are pivotally connected to bottom portions of the second container portion 24.

More specifically, the collapsible seat assembly includes seat units which include rigid mechanical components that fold and unfold with respect to each other when transformed from the nondeployed condition to the deployed condition, and vice versa.

The seat units can include an outer sheath, an inner sheath, and a rigid frame material disposed within the inner sheath. The outer sheath is preferably composed of rugged material, such as plastic material, which does not tear or collapse when cargo is loaded on top of it. The inner sheath can be composed of a vinyl and/or canvas material which is thick enough to allow normal sitting conditions to occur.

The rigid frame material can be composed of a hard plastic or metal material to serve as a sturdy frame to allow five people, weighing 250 pounds each, to sit without collapsing.

The first embodiment of the invention is shown in FIGS. 1-4. Initially, this embodiment of the invention is shown in a nondeployed condition or storage mode in FIG. 4.

Figure 2:
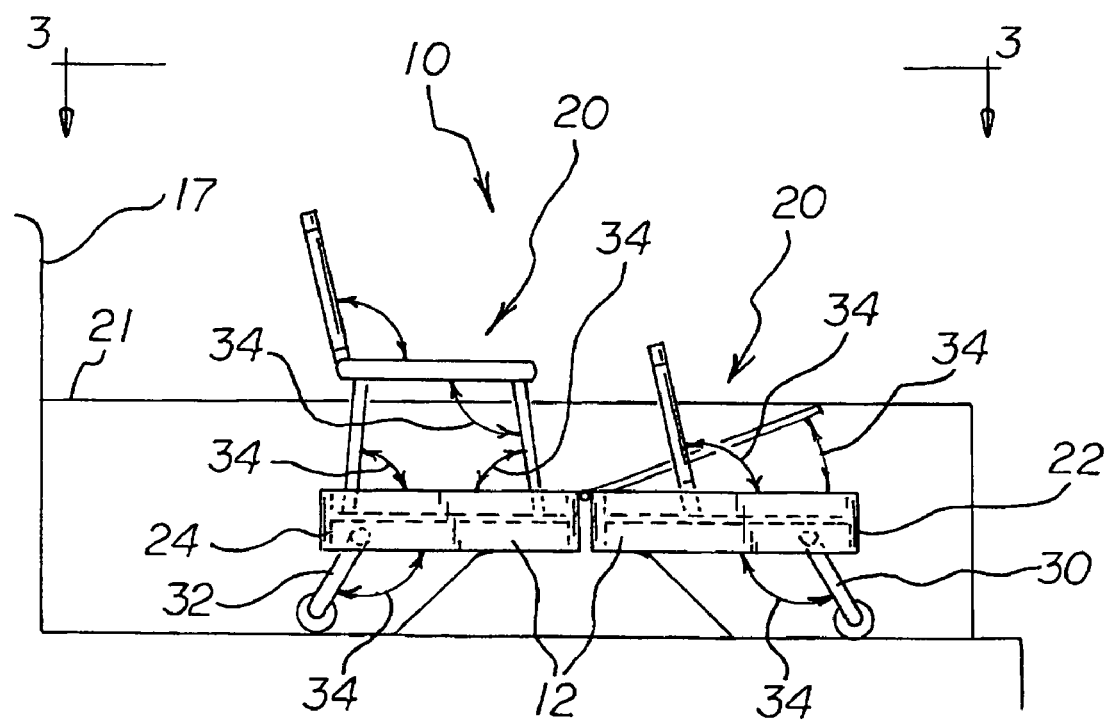
FIG. 2 is a side view of the embodiment of the collapsible seating apparatus shown in FIG. 1 taken along line 2-2 of FIG. 1, wherein a sidewall of the pickup truck is substantially invisible.
Figure 5:
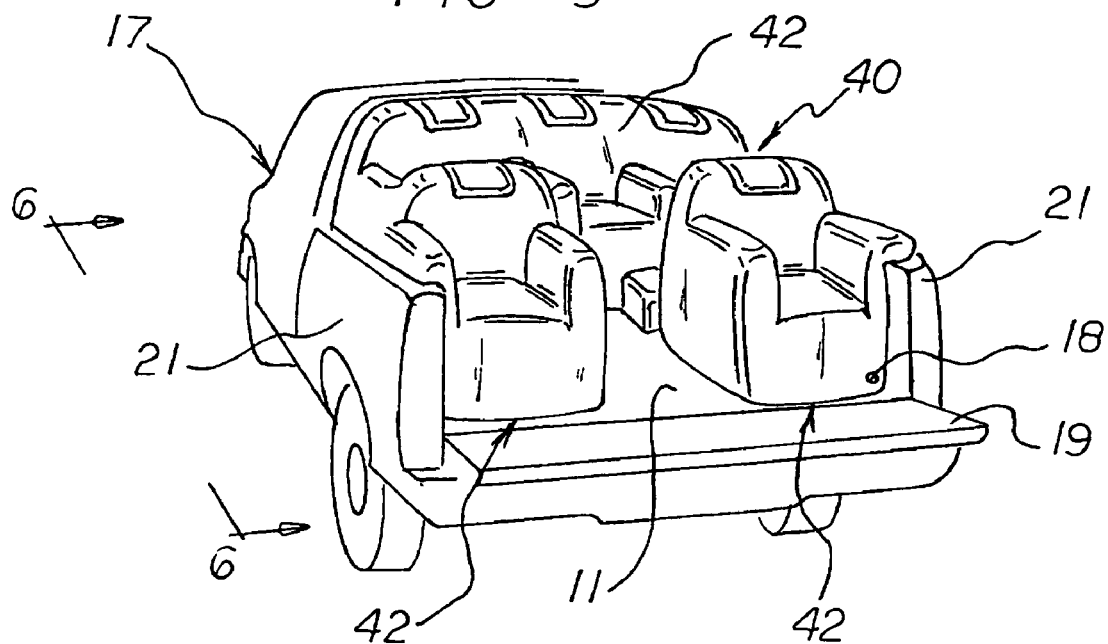
FIG. 5 is a rear perspective view showing a second embodiment of the collapsible seating apparatus of the invention which are made from flexible material, that are inflated with air to become substantially rigid in a deployed, inflated condition, and that are on the bed of a pickup truck.
Figure 6:
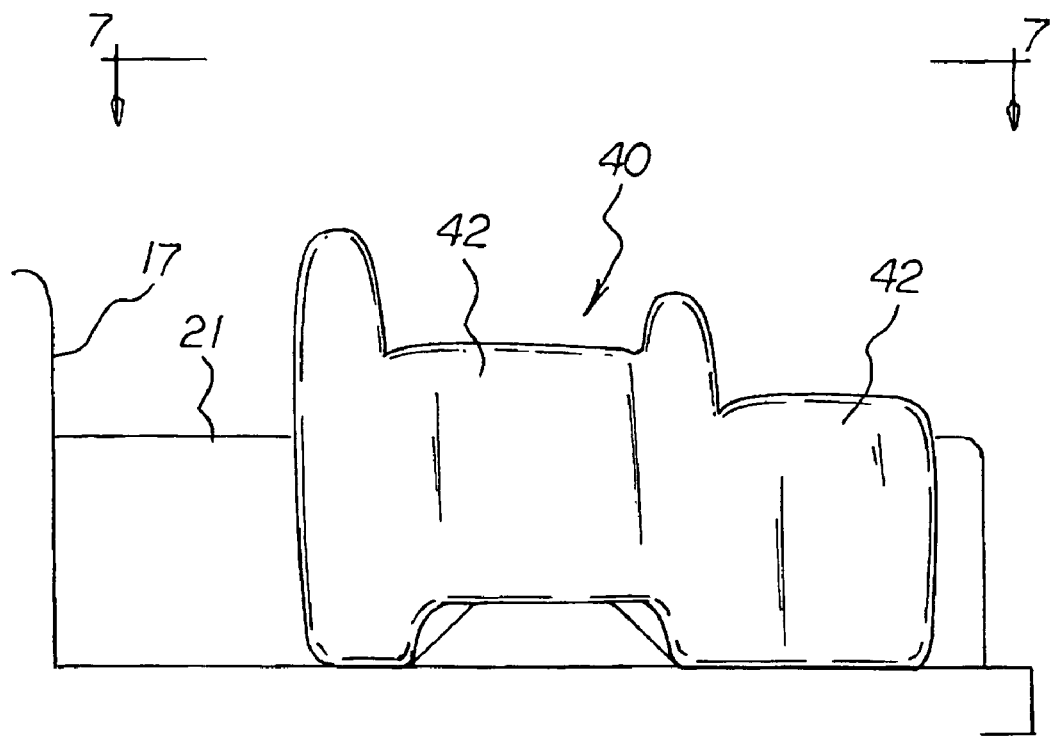
FIG. 6 is a side view of the embodiment of the collapsible seating apparatus shown in FIG. 5 taken along line 6-6 of FIG. 5, wherein a sidewall of the pickup truck is substantially invisible.
Figure 7:
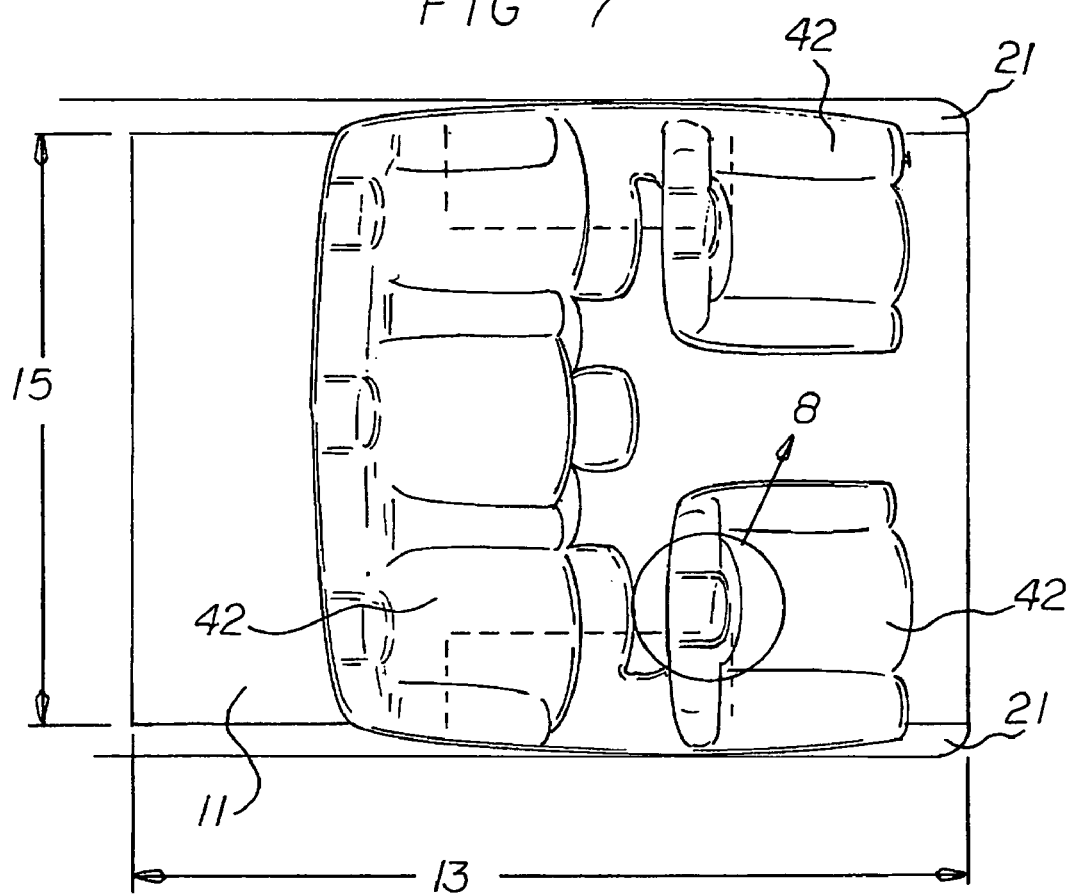
FIG. 7 is a top view of the embodiment of the collapsible seating apparatus of FIG. 6 taken along line 7-7 thereof.

To deploy the first embodiment to the deployed condition, shown in FIGS. 1-3, the first foldable wheel units 30 are deployed as shown in FIG. 2 and as indicated by a directional arrow 34 between the first container portion 22 and the first foldable wheel units 30. The second foldable wheel units 32 are deployed with respect to the second container portion 24 as shown by the directional arrow 34 between the second container portion 24 and the second foldable wheel units 32.

Then, the apparatus, having already deployed first foldable wheel units 30 and second foldable wheel units 32, is placed on the vehicle bed 11. Then, the second container portion 24 is opened with respect to the first container portion 22 around the hinge assembly 26. In this way, the first foldable wheel units 30 and the second foldable wheel units 32 are resting upon the vehicle bed 11. Then, the foldable seat units 20 are unfolded out from the first container portion 22 and the second container portion 24. Directional arrows 34 depict unfolding and folding directions of movement of various pivotally connected components of the foldable seat units 20.

The present invention is not concerned with the detailed interconnections between pivotally connected components of foldable seats. A wide variety of folding seat arrangements are well known and can be used with the present invention.

To unfold the deployed foldable seat units 20 to the nondeployed condition, the directional arrows 34 are followed in reverse order. Also, the first foldable wheel units 30 and the second foldable wheel units 32 are folded up with respect to the first container portion 22 and the second container portion 24, respectively.

In accordance with a second embodiment of the invention, shown in FIGS. 5-8, the collapsible seat assembly includes inflatable seat units 42 which are made from flexible material, that are inflated with air to become substantially rigid in a deployed, inflated condition. For storage purposes, the inflatable seat units 42 are deflated into a nondeployed condition. At least one of the inflatable seat units 42 includes an inlet/outlet 18 for permitting inflation and deflation of the inflatable seat units 42. Preferably, a plurality of inflatable seat units 42 share a common source of inflation.

When the inflatable seat units 42 are made from inflatable material, an electrically powered blower (not shown) can be employed to carry out the inflation. Such electrically powered blowers are conventionally employed to inflate air mattresses. The electrically powered blower can be powered by a vehicle cigarette lighter or the vehicle battery.

The inflatable seat units 42 are preferably composed of rugged material, such as plastic material, which does not tear or collapse when inflated with air or when sat upon during normal sitting conditions. The inflatable material is selected so that the inflatable seat units allow five people, weighing 250 pounds each, to sit without collapsing To deploy the second embodiment of the collapsible seating apparatus 10, shown in FIGS. 5-8, the inflatable seat units 42 in the nondeployed condition are placed on the vehicle bed 11. Then, an electrically powered blower is connected with the inlet/outlet 18, and air is blown into the inflatable seat units 42. The inflatable seat units 42 in the deployed condition are shown in FIGS. 5-8.

To return the deployed inflatable seat units 42 to the nondeployed condition, air is released from the inflatable seat units 42 through the inlet/outlet 18.

Figure 8:
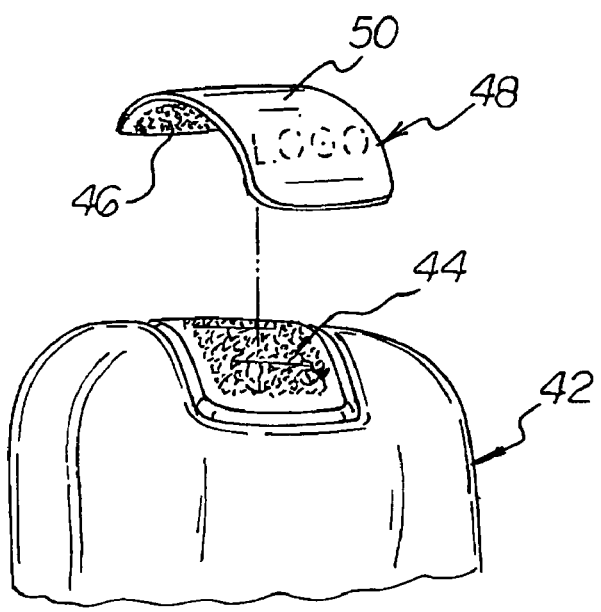
FIG. 8 is a partially exploded perspective view of a portion of the embodiment of the invention shown in FIG. 7, that is contained in the circled area 8 of FIG. 7.

As shown in FIG. 8, top portions of the collapsible seat assembly can include a quantity of first hook or loop material 44. A patch assembly 48 can be provided for attachment with the first hook or loop material 44 on a top portion of the collapsible seat assembly.

More specifically, the patch assembly 48 includes a quantity of second complementary hook or loop material 46 for attachment to the first hook or loop material 44. A patch support layer 50 is provided which supports the second hook or loop material 46. The patch support layer 50 can include a logo which is visible from above the top surface of the patch support layer 50. Different patch assemblies 48 can have different logos and can be readily substituted for other patch assemblies on the collapsible seat assembly.

Generally, the components of the collapsible seating apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved collapsible seating apparatus that is low in cost, relatively simple in design and operation, and which may advantageously be used without employing the tailgate of a vehicle for support of the seating apparatus. With the invention, a collapsible seating apparatus is provided which does not employ chairs supported on the ground. With the invention, a collapsible seating apparatus is provided which does not employ the roof of a vehicle. With the invention, a collapsible seating apparatus is provided which can be easily collapsed for easy transport by a pickup truck and removal from the pickup truck. With the invention, a collapsible seating apparatus is provided which that provides one class of embodiments which includes seats that have rigid mechanical components that fold and unfold with respect to each other. With the invention, a collapsible seating apparatus is provided which provides another class of embodiments which includes seats that are made from flexible material, that are inflatable with air to become substantially rigid, and that collapse when air is removed from the inflatable seats.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it is emphasized that the annexed Abstract is provided to comply with the rules requiring an abstract that will allow a searcher or other reader to quickly ascertain the subject matter of the technical disclosure herein. It is submitted with the understanding that it will not be used to interpret or limit the scope or meaning of the following claims.

What is claimed as being new and desired to be protected by Letters Patent of the United States is as follows:

1. A collapsible seating apparatus for use on a bed of a vehicle, wherein the vehicle bed includes a vehicle bed length and a vehicle bed width, comprising:
    a container which includes a container length which is substantially less than the vehicle bed length and which includes a container width which is less than the vehicle bed width, and
    a collapsible seat assembly retained in said container in a nondeployed condition, wherein, when said collapsible seat assembly is transformed into a deployed condition, said deployed collapsible seat assembly fits upon the vehicle bed.

2. The apparatus of claim 1 wherein said container includes:
    a first container portion,
    a second container portion, and
    a hinge assembly connected between said first container portion and said second container portion.

3. The apparatus of claim 2 wherein said collapsible seat assembly includes foldable seat units which include rigid mechanical components that fold and unfold with respect to each other with respect to transforming from said nondeployed condition to said deployed condition.

4. The apparatus of claim 3 wherein said first container portion houses two foldable seat units and an article storage compartment.

5. The apparatus of claim 3 wherein said second container portion houses three foldable seat units.

6. The apparatus of claim 2, further including:
    first foldable wheel units pivotally connected to bottom portions of said first container portion, and
    second foldable wheel units pivotally connected to bottom portions of said second container portion.

7. The apparatus of claim 1 wherein said collapsible seat assembly includes inflatable seat units which are made from flexible material, that are inflated with air to become substantially rigid in a deployed, inflated condition, and which are deflated into a nondeployed condition, and wherein at least one of said inflatable seat units includes an inlet/outlet for permitting inflation and deflation of said inflatable seat units.

8. The apparatus of claim 1 wherein top portions of said collapsible seat assembly include a quantity of first hook or loop material.

9. The apparatus of claim 8, further including:
    a patch assembly for attachment with said first hook or loop material on a top portion of said collapsible seat assembly.

10. The apparatus of claim 9 wherein said patch assembly includes:
    a quantity of second hook or loop material for attachment to said first hook or loop material, and
    a patch support layer which supports said second hook or loop material.

* * * * *